United States Patent
Hammer et al.

(10) Patent No.: US 9,707,644 B2
(45) Date of Patent: Jul. 18, 2017

(54) METHOD FOR CONNECTING TWO VEHICLE COMPONENTS AND/OR TWO NON-VEHICLE COMPONENTS

(71) Applicant: Bayerische Motoren Werke Aktiengesellschaft, Munich (DE)

(72) Inventors: Maik Hammer, Eching (DE); Johann van Niekerk, Munich (DE); Thomas Herzinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 690 days.

(21) Appl. No.: 13/656,133

(22) Filed: Oct. 19, 2012

(65) Prior Publication Data
US 2013/0043228 A1 Feb. 21, 2013

Related U.S. Application Data

(63) Continuation of application No. PCT/EP2011/000864, filed on Feb. 23, 2011.

(30) Foreign Application Priority Data

Apr. 28, 2010 (DE) .................... 10 2010 028 322
Apr. 28, 2010 (DE) .................... 10 2010 028 323

(51) Int. Cl.
*B23K 37/04* (2006.01)
*F16B 5/06* (2006.01)
(Continued)

(52) U.S. Cl.
CPC ............ *B23K 37/04* (2013.01); *B23K 26/244* (2015.10); *B23K 26/60* (2015.10); *F16B 5/0642* (2013.01);
(Continued)

(58) Field of Classification Search
CPC B23K 37/04; B23K 2201/006; B23K 26/244; B23K 26/60; Y10T 403/7064;
(Continued)

(56) References Cited

U.S. PATENT DOCUMENTS 2,275,900 A * 3/1942 Hall ................................ 52/511
3,188,731 A * 6/1965 Sweeney ........................ 29/430
(Continued)

FOREIGN PATENT DOCUMENTS

DE 10 2009 049 602 B3 7/2011
EP 2 154 054 A1 2/2010
(Continued)

OTHER PUBLICATIONS

International Search Report dated Jun. 8, 2011 including English-language translation (Four (4) pages).

*Primary Examiner* — Quang D Thanh
*Assistant Examiner* — Renee Larose
(74) *Attorney, Agent, or Firm* — Crowell & Moring LLP

(57) ABSTRACT

A method is provided for connecting a first component to a second component. The two components are placed against each other and pre-fixed, wherein the two components are attached and immovably connected to each other at at least one first connection point via a first detachable component connection and are attached and connected to each other so as to be movable relative to each other in a sliding direction at at least one second connection point via a second detachable component connection. The pre-fixed components are rigidly connected, in particular, by welding.

24 Claims, 3 Drawing Sheets

(51) Int. Cl.
*F16B 5/08* (2006.01)
*B23K 26/244* (2014.01)
*B23K 26/60* (2014.01)
B23K 101/00 (2006.01)
F16B 21/07 (2006.01)

(52) U.S. Cl.
CPC .......... *F16B 5/08* (2013.01); *B23K 2201/006* (2013.01); *F16B 21/073* (2013.01); *Y10T 29/49826* (2015.01); *Y10T 403/471* (2015.01); *Y10T 403/7062* (2015.01); *Y10T 403/7064* (2015.01)

(58) Field of Classification Search
CPC ......... Y10T 29/49826; Y10T 403/7062; Y10T 403/471; F16B 5/0642; F16B 5/08; F16B 21/073
USPC ............................... 219/200, 121.64; 29/428
See application file for complete search history.

(56) References Cited

U.S. PATENT DOCUMENTS

| 4,637,116 | A | * | 1/1987 | Parisch et al. ............... 29/441.1 |
| 5,451,742 | A | * | 9/1995 | Nishio et al. ............ 219/121.64 |
| 2008/0210672 | A1 | * | 9/2008 | Meyer et al. ............ 219/121.64 |
| 2011/0173797 | A1 | | 7/2011 | Van Niekerk et al. |

FOREIGN PATENT DOCUMENTS

| EP | 2154054 A1 * | 2/2010 |
| WO | WO 2006/051022 A1 | 5/2006 |

* cited by examiner

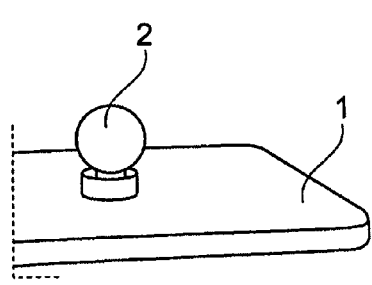
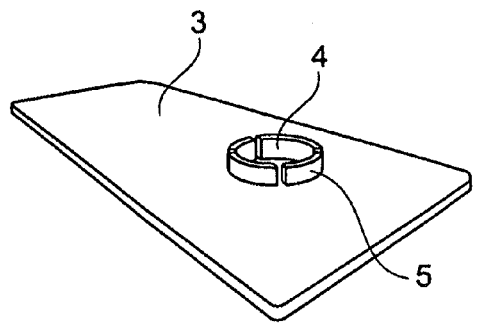
Fig. 1	Fig. 2
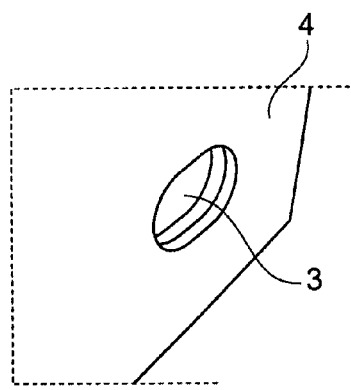
Fig. 3
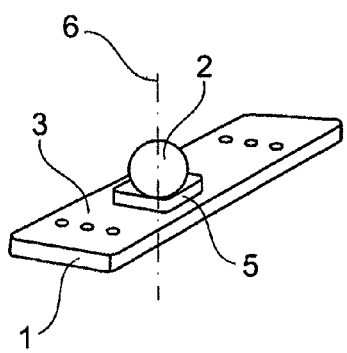
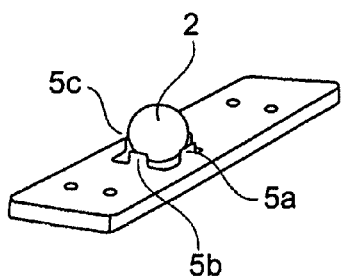
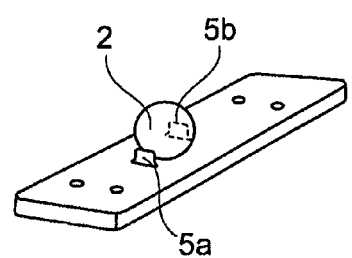
Fig. 4	Fig. 5	Fig. 6

METHOD FOR CONNECTING TWO VEHICLE COMPONENTS AND/OR TWO NON-VEHICLE COMPONENTS

CROSS REFERENCE TO RELATED APPLICATIONS

This application is a continuation of PCT International Application No. PCT/EP2011/000864, filed Feb. 23, 2011, which claims priority under 35 U.S.C. §119 from German Patent Application Nos. DE 10 2010 028 323.1, filed Apr. 28, 2010 and DE 10 2010 028 322.3, filed Apr. 28, 2010, the entire disclosures of which are herein expressly incorporated by reference.

This application contains subject matter related to U.S. application Ser. No. 13/678,030, filed on Nov. 15, 2012, entitled "Method for Connecting Two Vehicle Components and/or Two Non-Vehicle Components," and U.S. application Ser. No. 13/656,139, filed on Oct. 19, 2012, entitled "Component Connection and/or Method for Connecting Components", filed on even date herewith.

BACKGROUND AND SUMMARY OF THE INVENTION

The present invention relates to a method for the connection of two vehicle components, as well as to a method for the connection of two non-vehicle components.

The prior art particularly includes the German patent application DE 10 2009 049 602.5 by Bayerische Motoren Werke Aktiengesellschaft, which, however is not a prior publication.

In the mass production of vehicle bodies, a number of individual body components and mounted components, such as brackets, for example, are assembled mostly automatically. In a joining process, two or more body components are first positioned relative to each other and then connected to each other, for example by welding, clinching, or by other joining methods. In order to preserve a prespecified joint gap, a clamping and fastening procedure which is time and effort intensive is necessary, and must be individually conceptualized and implemented for the components being joined. The clamping procedure fixes the components being joined while in a cold state. If the components will then be welded to each other, the heat stresses occurring during the process can lead to a displacement of the components relative to each other. The joint gap frequently changes during the process, and this can have a negative effect on the strength of the welded connection.

In the aforementioned DE 10 2009 049 602.5, there is a loose initial fastening of two components which will be rigidly connected to each other. For this purpose, a spaced, spherical positive-fit element is included on one of the components and engages in a recess of the second component, said recess being like a key hole, for example. The two components being connected to each other are brought together and are then displaced relative to each other. The displacement creates a positive lock between the spherical positive fit element and the keyhole-like recess. The two components are pre-fixed by the positive lock relative to each other and in a sufficiently rigid manner, in a defined position, such that they can then be rigidly connected to each other with no further clamping tools, for example by welding.

The problem addressed by the invention is that of providing a method for the connection, particularly for the welding, of two vehicle components and/or two non-vehicle components, wherein the components being connected can be pre-positioned relative to each other in a simple and advantageous manner.

This problem is solved by a method for the connection of a first connection component to a second connection component having the following steps: placing the two connection components against each other and pre-fixing the same, wherein the two components are fitted together and connected to each other in a manner prohibiting sliding via a first detachable component connection at at least one first connection point, and are fitted together and connected to each other in a manner allowing sliding relative to each other in a sliding direction via a second detachable component connection at at least one second connection point. Advantageously, the pre-fixed connection components are rigidly connected, particularly by welding. The connection components may be vehicle components and/or non-vehicle components.

The basic principle of the invention is that two vehicle components and/or non-vehicle components, which will be connected and/or welded to each other, are pre-positioned by plug and/or clamp connections and pre-fixed in a reversible manner. Next, the pre-fixed components can be connected to each other in a "permanent" manner, particularly by way of a material connection. The two vehicle components and/or non-vehicle components can be "permanently" connected to each other by, for example, welding, soldering, bolting, or by other connection techniques. In this context, however, "permanent" does not necessarily mean "non-detachable." Rather, what is meant is that the pre-fixed components are connected to each other via one or more connections, such that a higher connection strength is achieved overall than is achieved by way of the connection elements alone according to the invention.

The term "connection component" includes both "vehicle component" and "non-vehicle component".

The term "vehicle component" should be interpreted as broadly as possible. It includes a number of types of components which can be connected during the production of a vehicle, particularly, but not exclusively, vehicle body components, and also other components such as so-called "mounted components" of vehicles (holding devices for auxiliary assemblies, etc.). The term "vehicles" includes both passenger motor vehicles and commercial vehicles such as tractor trailers, rail vehicles, motorcycles, etc.

The term "non-vehicle component" should likewise be interpreted very broadly. It fundamentally includes all types of components which are intended for applications outside of the vehicle (production) field, particularly outside of the road vehicle (production) field. For example, the invention can be used in the following fields:

(A) The "white goods" field, meaning the production of household appliances such as refrigerators, freezers, ice boxes, electric ovens, washing machines, dishwashing machines, clothes dryers, etc.—particularly for the connection of (sheet metal) housing components intended for household appliances.

1. Housing components can be fitted together, not only for the purpose of pre-fixing the same, but also "the ball" can specifically be used as a joining element which allows later disassembly.

2. The ball as a standardized element for assembly components, for example insulation material, paneling, electronic/control devices, cables, etc.

3. The component connection according to the invention can be used, among other things, as a floating mount for heat exchangers in a refrigerator or drying machine, for example.

(B) The production of furniture, particularly the connection of individual furniture components. The invention could be used in the production of, for example:

1. home furniture and kitchen furniture, office furniture, laboratory furniture, street furnishings, urban outdoor furniture, park furnishings, garden furniture—for example for the positioning and pre-fixing of structural and installation components;

2. sheet metal components, for the pre-fixing of components which will then be fixed with a small number of joining elements (e.g. bolts); and 3. for the spatial orientation of multiple furniture components via the ball (a second component/furniture part "slips" over the sphere into the correct position relative to a first component/furniture part).

(C) Construction, particularly the connection of individual components of a house, such as the connection of façade elements, for example. Fastening and anchor systems in the structural aspects of the construction, for example roof structures. Trade fair booths which can be disassembled.

(D) Aircraft construction, particularly airplane construction, and further particularly the connection of components of aircraft.

(E) Toys, particularly the connection of individual toy components.

The above list of possible applications of the invention is purely exemplary in nature and not in any way to be understood as restrictive of the invention.

Even though the following description is primarily rendered in connection with "vehicle components," it is hereby expressly indicated that all aspects of the invention can also be used in the field of "non-vehicle components." Particularly, aspects of the invention which relate to a method for the connection of vehicle components can also be used in methods relating to "non-vehicle components."

The vehicle components and/or non-vehicle components being connected to each other are first placed against each other and fitted together. While fitted together, they are held together by individual "clamp elements" and (pre-)fixed relative to each other in this manner, similarly to the manner which is known for plug-in building blocks in the toy industry.

The pre-positioning and/or pre-fixing is carried out by way of at least one "first detachable component connection" to a "first connection point," and by means of at least one "second detachable component connection" to a "second connection point" which is distanced from the first connection point. The vehicle components and/or non-vehicle components can also be (pre-) assembled by means of multiple "first component connections" and/or multiple "second component connections."

The two vehicle components and/or non-vehicle components are connected to each other at the "first connection point" in a manner prohibiting sliding. In contrast, they are connected to each other at a "second connection point" in a manner enabling sliding in a sliding direction.

An essential advantage of such a pre-assembly of the components is that the two vehicle components and/or non-vehicle components being joined are pre-assembled in a "floating" manner. "Floating" means that the second component connection enables a certain relative displacement of the two components. The first component connection in this case can be interpreted as a "fixed bearing," and the second component connection can be interpreted as a "sliding- and/or floating bearing" which enables a relative displacement in at least one direction determined by the construction. The second component connection is preferably designed and arranged in such a manner that its degree of sliding freedom enables heat stresses occurring during a welding process to largely evolve unhindered. As such, unintended changes in the joint gap are avoided, enabling a qualitatively high-quality welded connection.

Also, in the case of a floating pre-fixing, the two vehicle components and/or non-vehicle components considered as a whole can be connected to each other without any play in directions which are perpendicular to the direction of insertion, following the two being fitted together on the fixing elements.

In addition to a clamp connection, a positive fit connection which works in the insertion direction can be included between the fixing elements—particularly a "back taper" of the male and of the female fixing elements. However, such a positive fit need not necessarily be included.

Preferably, at least one of the at least two "plug and/or clamp connections" (component connections) is formed by a "male" fixing element which is spaced apart from one of the two component connections, and by a "female" fixing element included on the other vehicle component and/or non-vehicle component for the purpose of receiving the male fixing element. A clamp connection between the two vehicle components and/or non-vehicle components can be produced by the insertion of the male fixing element into the female fixing element in an insertion device. The two components are therefore fixed to each other and/or relative to each other in a friction-fit and/or positive-fit connection.

According to aspects of the invention, the male fixing element has, either partially or entirely, the shape of a sphere and/or a spherical cap, or a sphere-like shape. The male fixing element can particularly be a sphere or a spherical cap made of solid material, particularly a steel or aluminum sphere. In principle, the male fixing element could also consist of another material such as plastic, for example.

The term "sphere" and/or "sphere-like" should be interpreted very broadly, and should not be restricted to the mathematical term meaning a spherical or sphere-cap geometry. The terms "sphere" and/or "sphere-like" can be interpreted in the sense of, for example "convexly curved." In general, these terms generally encompass "round" and/or "curved," particularly "convexly curved" geometries.

The sphere or sphere-like male fixing element is preferably rotationally symmetric with respect to a normal direction of one or both vehicle components and/or non-vehicle components at the position of the male fixing element.

A male fixing element designed in this manner can be fitted together to the second vehicle component and/or non-vehicle component in a very simple manner. The risk of the two vehicle components and/or non-vehicle components becoming unintentionally stuck and/or jammed on their fixing elements when they are fit together is minimized by a round, edge-free or substantially edge-free geometry of the male fixing element.

The term "female fixing element" should likewise be given a very broad interpretation. The term fundamentally includes all constructive designs which enable the accommodation and clamping of the male fixing element in an insertion direction.

According to an aspect of the invention, the male fixing element is at least slightly oversized with respect to the female fixing element to produce an interference fit. This can particularly be in a direction which is perpendicular to the insertion direction. Due to the oversize dimension, the two vehicle components and/or non-vehicle components remain detachably clamped together at the fixing elements after they are fitted together. In order to enable this fitting together, and to make it possible to maintain a sufficient clamping force when the components are fit together, the two fixing elements—or at least one of the two fixing elements—must have a certain "minimum elasticity." If a "full sphere" and/or "full sphere cap" having a comparatively low elasticity is used as the male fixing element, then the minimum elasticity required for fitting the components together can be achieved by a corresponding elastic design of the female fixing element.

The female fixing element can be formed by a "passage hole" in the second vehicle component and/or non-vehicle component. The term "passage hole" should be interpreted broadly and not restricted to a certain bore geometry per se. The passage hole can be circular or have a geometry which deviates from a circular shape, for example, such as a substantially square geometry, a triangular, rectangular, or polygonal geometry wherein the "corners" can be rounded off.

As indicated above, the two vehicle components and/or non-vehicle components can be (pre-)fixed relative to each other via multiple such component connections. As such, a "further male fixing element" can be included on one of the two vehicle components and/or non-vehicle components, likewise having the shape, either partially or entirely, of a sphere and/or having a sphere-like shape, wherein said "further male fixing element" can be inserted, and/or is inserted, in the same insertion direction as the first male fixing element, into an assigned "further female fixing element" included on the other vehicle component and/or non-vehicle component.

The at least one further female fixing element can be formed by a slot and/or by an oblong passage hole in which the further male fixing element is able to slide in a longitudinal direction of the slot and/or the oblong passage hole.

According to one embodiment of the invention, at least one clamp element, the same being spaced apart from the second vehicle component and/or non-vehicle component and being capable of elastic bending, is included on an edge of the passage hole which forms the female fixing element. The clamp element exerts a clamp force onto the outer side of the male fixing element, and this clamp force substantially acts perpendicular to the insertion direction from the outside inward. The clamp element can grip behind the male fixing element. However, this need not necessarily be the case. If a back taper is used, an "excess pressure" occurs when the two fixing elements are joined together, i.e. are fitted together, and therefore there is an audible locking of the male fixing element in and/or to the female fixing element.

The clamp element can be a clamp collar which extends along the entire edge of the passage hole. As an alternative, a clamp collar element can be included which extends only along a peripheral section. In addition, multiple clamp collars can be included which are spaced apart from each other along the periphery of the passage hole, and each grasp the male fixing element on one peripheral section or at a point on the periphery. In addition, it is possible for only a subset of the clamp collars included in the configuration to press against the male fixing element from the outside inward.

In addition, the clamp collar and/or the clamp collars can be spaced apart from the second vehicle component and/or non-vehicle component in the direction of insertion or opposite the direction of insertion. The at least one clamp collar need not stand exactly upright with respect to the second vehicle part, but rather can be set at a slight tilt. For example, the at least one clamp collar can create an angle with the surface of the second vehicle component in the range of 80° to 90°.

The first and/or the second vehicle component and/or non-vehicle component can be a sheet metal component. In the case of a vehicle component, this can particularly be a body component. The passage hole which forms the female fixing element can be stamped out of the second vehicle component and/or non-vehicle component. The clamp collar can be a "bent" and/or "elevated" section of the stamped-out passage hole.

One of the two vehicle components and/or non-vehicle components can particularly be deep-drawn parts. The at least one female fixing element which can be formed by a passage hole, for example, can be directly stamped out in a deep drawing tool, or can be produced in a subsequent manufacturing step.

The two pre-fixed vehicle components and/or non-vehicle components are rigidly connected to each other following the pre-fixing, for example in a "single-sided joining process." Single-sided joining processes have the advantage that the seam and/or the seam region need only be accessible from one side thereof, and not from both (opposite) sides. In the construction of vehicle bodies, it is not always the case that both sides are accessible, due to space constraints. Single-side joining processes which can be contemplated include thermal joining processes, for example, such as laser welding, conventionally with or without additional material, for example, "remote laser welding," MIG or MAG welding, WIG welding, plasma welding, soldering, impact points (single-sided spot welding processes), or cold, mechanical joining processes such as direct bolting, riveting, particularly blind riveting, clinching, bolt firing, or gluing.

According to one embodiment of the invention, the two pre-fixed vehicle components and/or non-vehicle components are permanently rigidly connected to each other via a longitudinal welded seam. In order to avoid heat tension during the welding, the degree of freedom for the sliding of the second component connection(s) should be substantially parallel, and particularly coaxial, to the longitudinal direction of the welded seam, such that the primary dimension of expansion during the welding process is parallel to the direction of the degree of freedom of the sliding movement.

The two vehicle components and/or non-vehicle components are preferably welded to each other by use of a focused laser beam (laser beam welding). Laser welding is a thermal joining process wherein thermal energy is applied to the components being welded. Because the laser beam is strongly focused, the two components only melt locally and become welded to each other at the melted position. The energy density in this case is adjusted by means of the laser power, the focus of the laser beam, and the movement of the laser beam relative to the workpiece. The movement can be realized in the "conventional" manner by the movement of the welding lens and/or by the deflection of the beam via one or more mirrors. In contrast to a resistance spot welding process, in the case of laser welding, the "component composite" need not be accessible to the welding tongs from both sides. Rather, it is possible for work to be performed from a single side.

One of both of the vehicle components and/or non-vehicle components can be components made of metal (sheet metal component(s)) or of plastic, particularly a fiber-reinforced plastic (e.g. carbon fiber component(s), fiberglass component(s), or the like).

In summary, the method according to the invention enables significant cost savings in the automotive industry, which is already highly automated. However, in fields outside of automobile manufacturing as well, and/or in fields wherein automation has seemed too costly to date, the invention offers the possibility of newly designing and automating manufacturing processes which have until now not been automated or have been mostly not automated, from the ground up, and this is associated with a high cost reduction potential. The method according to the invention can therefore be established in a number of fields, as a very cost-effective, geometry-independent, device-independent "standard connection process."

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a sheet of metal with a steel sphere welded onto the same;

FIGS. 2, 3 show a sheet of metal having a passage hole with a clamp collar around the periphery thereof;

FIGS. 4-6 show different exemplary embodiments with different clamp collars;

DETAILED DESCRIPTION OF THE DRAWINGS

Figure 7:
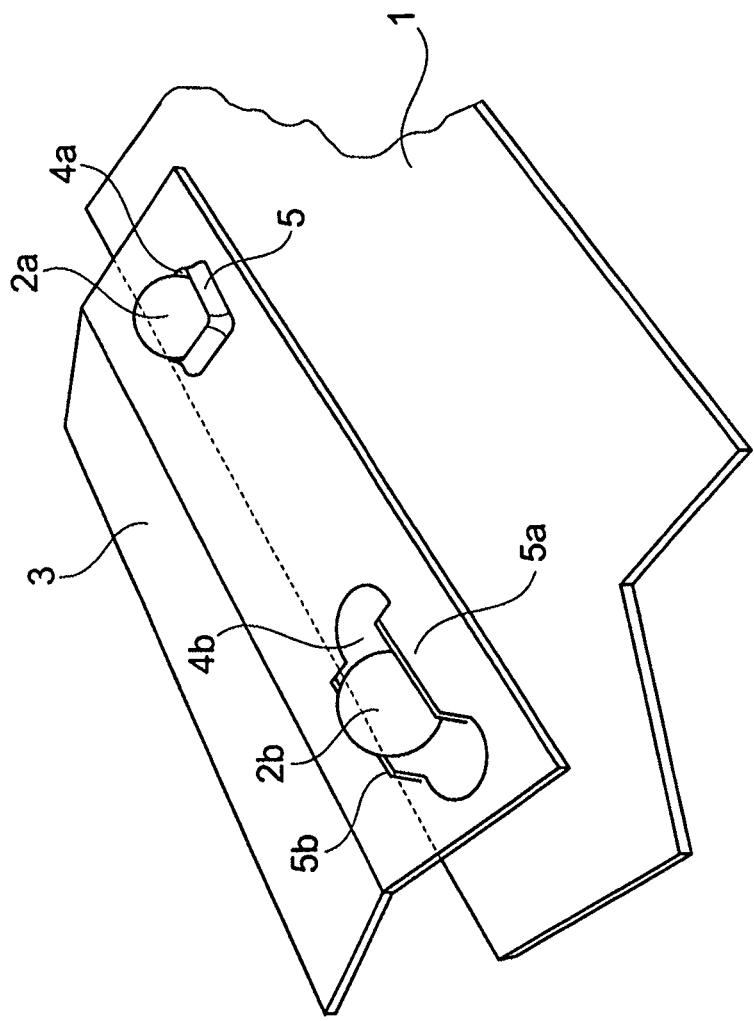
FIG. 7 shows two exemplary components according to the invention that are fixed to each other in a floating manner.

FIG. 1 shows a first sheet of metal 1, wherein a steel sphere 2 is welded onto the same.

FIGS. 2, 3 show a second sheet of metal 3, wherein a passage hole 4 is stamped into the same, having a curved collar 5 which functions as the clamp collar. The passage hole 4 and/or the clamp collar 5 have a diameter which is slightly smaller than the sphere 2. The clamp collar, however, is sufficiently elastic for the sphere to be able to be inserted through and/or into the passage hole 4.

The passage hole 4 can have a nearly rectangular and/or square shape, as shown in FIGS. 2, 3. In the case of a nearly square geometry of the passage hole 4, the clamp collar 5 presses the sphere 2 from the outside inward at four point positions which are spaced apart from each other at approx. 90°.

FIG. 4 shows the two metal sheets 1, 3 in the assembled state. The sphere fixed onto the metal sheet 1 has been inserted through the passage hole 4 from the bottom. The clamp collar 5 presses against the sphere 2 from the outside inward substantially perpendicular to the insertion direction 6. The two metal sheets 1, 3 are therefore positioned and fixed relative to each other substantially without play in directions which are perpendicular to the insertion direction 6.

FIG. 5 shows an embodiment wherein, rather than a peripheral clamp collar, multiple tooth-like clamp collar elements 5a, 5b, 5c are included, and are evenly distributed around the periphery.

In the embodiment in FIG. 6, only two such tooth-like clamp collar elements 5a, 5b are included, and are spaced approx. 180° from each other along the periphery. The two clamp collar elements 5a, 5b are arranged on sides of the sphere 2 which are opposite each other.

FIG. 7 shows one embodiment wherein a first sphere 2a and a second sphere 2b are arranged on a first metal sheet 1 at a distance from each other. Both spheres 2a, 2b can be welded onto the metal sheet 1.

A first rectangular and/or square passage hole 4a is included in the second metal sheet 3, and is assigned to the sphere 2a. This passage hole 4a has a clamp collar 5 running around the periphery, similarly to that shown in FIGS. 2-4. As such, the two metal sheets 1, 3 are fixed relative to each other in the region of the sphere 2a, perpendicular to the insertion direction.

In contrast, the second passage hole 4b is an oblong passage hole, having two clamp collars 5a, 5b running along the hole periphery which press against the outer side of the sphere 2b from opposite sides. In the arrangement shown in FIG. 7, the metal sheets are fixed to each other in a "floating" manner. Stresses between the attachment points are prevented by the oblong hole 4b.

The two metal sheets 1, 3 can be easily fit together and then permanently, rigidly connected to each other, for example by welding. The heat stresses occurring during the welding process are "automatically" compensated due to the floating arrangement of the two metal sheets.

Figure 8:
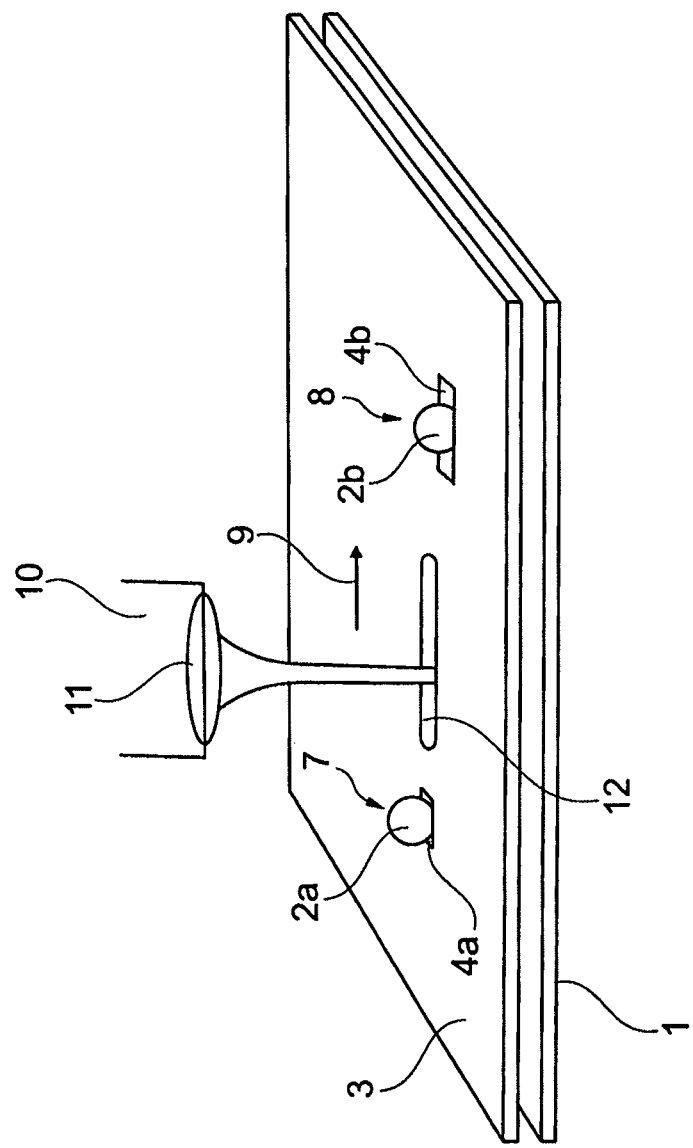
FIG. 8 shows the basic principle of the invention, of two vehicle components intended to be connected to each other by laser welding.

FIG. 8 shows an embodiment which is very similar to that in FIG. 7. A first component connection 7 is formed by a sphere 2a welded onto the metal sheet 1. This sphere 2a is inserted through a rectangular and/or square passage hole 4a included in the second metal sheet 3. A second component connection 8 is formed by a sphere 2b welding onto the first metal sheet 1. This sphere 2b is inserted through the oblong passage hole 4b.

The two metal sheets are therefore pre-fixed and floating in the direction of the arrow 9. A weld seam 12 is generated by way of a laser welding device 10 having a focusing lens 11. The welded seam 12 is parallel to the direction of the arrow 9. The welded seam 12 in this case is generated in the region between the two component connections 7, 8. The heat stresses occurring during the laser welding process can be compensated without problem by the floating fixation of the two metal sheets 1, 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for connecting a first connection component to a second connection component, the method comprising the acts of:
   placing the first and second connection components against each other;
   pre-fixing the first and second connection components together, wherein the connection components are attached and non-movably connected to each other at at least one first connection point via a first detachable component connection, and are attached and connected to each other so as to be movable relative to each other in a sliding direction at at least one second connection point via a second detachable component connection; and
   rigidly connecting the pre-fixed first and second connection components together,
   wherein at least one of the two components connections is produced by:

insertion of a male fixing element into a female fixing element in an insertion direction, wherein:

the male fixing element is spaced apart from one of the two connection components and has a sphere or sphere-like shape, the male fixing element being a separate part from the connection components and being connected to said one of the two connection components in a material-locking manner, and the female fixing element is included on the other one of the two connection components and receives the male fixing element, a clamp connection of the fixing elements being produced by the inserting of the male fixing element into the female fixing element in the insertion direction, wherein the second component connection is operatively configured such that heat stress occurring during the rigid connection is compensated in the sliding direction.

2. The method according to claim 1, wherein the act of rigidly connecting further comprises the act of welding the pre-fixed first and second connection components together.

3. The method according to claim 1, wherein the connection components are vehicle components.

4. The method according to claim 1, wherein the act of rigidly connecting further comprises the act of generating, via welding, a longitudinal welded seam substantially parallel and coaxial to the sliding direction.

5. The method according to claim 2, wherein the welding is carried out via a focused laser beam.

6. The method according to claim 1, wherein the male fixing element is over sized relative to the female fixing element substantially perpendicular to the insertion direction, wherein the two connection components are clamped together on the fixing elements.

7. The method according to claim 1, wherein the female fixing element comprises a passage hole formed in the second connection component.

8. The method according to claim 6, wherein the female fixing element comprises a passage hole formed in the second connection component.

9. The method according to claim 8, wherein the passage hole has a non-circular shape.

10. The method according to claim 9, wherein the passage hole has a polygonal shape.

11. The method according to claim 10, wherein the polygonal shape is at least one of a triangle, rectangle and square.

12. The method according to claim 1, wherein the two connection components are fixed in a region of the fixing elements in a manner prohibiting sliding relative to one another in directions perpendicular to the insertion direction.

13. The method according to claim 1, wherein the female fixing element is a slot and/or an oblong passage hole in which an assigned male fixing element is slidable in a longitudinal direction of the slot and/or the oblong passage hole.

14. The method according to claim 7, further comprising the act of exerting a clamping force onto an outer side of the male fixing element from the outside inward and substantially perpendicular to the insertion direction via at least one clamp element capable of elastic bending that is included at a distance from the second connection component on an edge of the passage hole.

15. The method according to claim 14, wherein the clamp element grips the assigned male fixing element from behind to form a positive-fit.

16. The method according to claim 14, wherein the clamp element is a clamp collar extending along substantially an entire edge of the passage hole.

17. The method according to claim 14, wherein the clamp element comprises multiple clamp collars along an edge of the passage hole, the multiple clamp collars being spaced apart from one other along a periphery and abut against the male fixing element from the outside inward along a section of the periphery.

18. The method according to claim 14, wherein the clamp element comprises one or more clamp collars that project from the second connection component in an insertion direction.

19. The method according to claim 1, wherein at least one of the first and second connection components is a vehicle sheet metal component.

20. The method according to claim 1, wherein at least one of the first and second connection components is a vehicle body component.

21. The method according to claim 7, wherein the passage hole is formed by stamping the passage hole out of the second connection component.

22. The method according to claim 16, wherein the clamp collar is a bent section of the second connection component.

23. The method according to claim 1, wherein the male fixing element comprises only metal.

24. The method according to claim 1, wherein the male fixing element is welded onto the first connection component.

* * * * *